United States Patent [19]

Shutt

[11] 4,130,538

[45] Dec. 19, 1978

[54] PREPARATION OF SMOKE AND FLAME RETARDANT RESINOUS COMPOSITIONS

[75] Inventor: Thomas C. Shutt, St. Louis, Mo.

[73] Assignee: Vitrofil Corporation, Denver, Colo.

[21] Appl. No.: 834,741

[22] Filed: Sep. 19, 1977

[51] Int. Cl.$^2$ .................. C08K 3/22; C08K 3/34; C08K 3/40

[52] U.S. Cl. .................. 260/40 R; 260/45.7 R

[58] Field of Search .................. 260/40 R, 45.7 R

[56] References Cited

U.S. PATENT DOCUMENTS

| | | | |
|---|---|---|---|
| 3,342,898 | 9/1967 | Roselli | 260/45.7 R X |
| 3,897,387 | 7/1975 | O'Shaughnessy | 260/45.7 R |
| 3,931,095 | 1/1976 | Kondo et al. | 260/45.7 R |
| 4,016,131 | 4/1977 | Shutt et al. | 260/40 R |

Primary Examiner—Sandra M. Person
Attorney, Agent, or Firm—Arthur A. March

[57] ABSTRACT

Preparation of improved smoke and flame retardant high structural strength resinous compositions by incorporating fractured finely ground solid powder particles of soda-containing silicate glass, especially soda-lime-silicate glass, having a high and irregular surface area and an average particle size below about 40 mesh, and a finely divided inorganic solid oxidic boron material capable of forming inert glass upon being heated, e.g. sodium tetraborate (anhydrous, pentahydrate and decahydrate), boric acid, and boron oxide, alone or combined in an average particle size below about 40 mesh, into the corresponding resin or synthetic plastic, e.g. polyester, in intimate and substantially uniform distribution therein to form an admixture therewith prior to curing, said boron material being incorporated in an effective amount, e.g. between about 1–50% based on the combined weight of the resin and boron material present, for imparting an active flame retarding property to the cured resin, and said boron material and particles of glass correspondingly being incorporated in a combined effective amount for imparting an active smoke retarding property to the cured resin, e.g. with said particles of glass being conjointly incorporated in an amount of between 1–60% based on the combined weight of the resin and particles of glass present, preferably yet optionally for combining in turn with fiber-glass, e.g. in the weight ratio range of about 70–90% resin-boron material-glass-mixture to about 30–10% fiber-glass, to produce upon curing, preferably fiber-glass reinforced, resinous or plastic products of high structural strength possessing improved conjoint smoke and flame retardancy.

46 Claims, No Drawings

PREPARATION OF SMOKE AND FLAME RETARDANT RESINOUS COMPOSITIONS

The present invention relates to the preparation of smoke and flame retardant resinous compositions, and more particularly to the incorporation of improved smoke and flame retarding conjoint agents of broad application, comprising an inorganic solid oxidic boron material and fractured, finely ground, solid powder particles of soda-containing silicate glass having a high and irregular surface area, in resinous compositions such as those of the type combined with fiber-glass and thereafter cured to form fiber-glass reinforced resinous or plastic products, whereby to impart improved smoke and flame retardancy thereto.

It is well known to those skilled in the art that resinous materials burn readily. Among such resinous materials are for example polyesters, vinyls, urethanes, styrenes, nylons and the like. These commonly available and normally employed synthetic resinous materials or plastics, readily burn at comparatively low temperatures, generating high heat and thereby sustaining their own burning.

In view of their prevalent burning properties, the wide use of many of these resinous materials represents a real detriment to the welfare of mankind. For example, the inclusion of polyesters in clothing and urethane materials in laminates used in homes, etc. obviously constitutes a continuing risk to those unfortunate persons exposed to the burning thereof, should a fire occur.

To minimize the potential of such risk due to fire, resin modifications have been provided heretofore, involving the inclusion therein of ingredients best described for convenience as flame retardants. These have found their way into commercial use as additives to such resinous materials whereby to cause a reduction in the burning ability of the ultimately cured resinous or plastic products made therefrom, although they do not appear to function in retarding or suppressing the attendant generation of smoke during resin burning. Generally, these flame retardants are added to the resinous materials by the resin manufacturer.

It is well recognized by those skilled in the art that the usual liquid flame retardants are expensive, and often highly toxic and therefore independently potentially dangerous. It is furthermore recognized that they function primarily either by generating flame inhibiting or suppressing gases during initial burning of the resinous material, thus increasing the attendant generation of smoke, or by chemically linking the resin polymer in such manner that the ends of the polymeric chain are rendered essentially non-burning in character.

Among the solid type flame retardants are boron oxidic materials or compounds such as boric acid, various metal borates, and the like; aluminum trihydrate, $Al(OH)_3$; etc. Aluminum trihydrate is now widely employed as a flame retardant, particularly in connection with synthetic plastics of the unsaturated polyester type. It is estimated that in 1976, almost 150 thousand tons of $Al(OH)_3$ were sold to meet flame retardant requirements. Aluminum trihydrate appears to function as a flame retardant for only one reason, namely, the contained water molecules are liberated into the associated resin during burning (i.e. by the general reaction $2Al(OH)_3 \rightarrow Al_2O_3 + 3H_2O$). This is explainable by the fact that the heat of burning is sufficient to drive off the water present and does so at such a temperature that the liberated water absorbs sensible heat generated during the oxidation reaction, or burning, and thereby, of course, reduces the rate of burning, as perhaps by a kind of quenching mechanism.

Nevertheless, it is also well recognized that aluminum trihydrate serves another purpose in resins. Specifically, besides being used as a flame retardant therein, it also functions as a filler. Although the physical and chemical properties of the resin generally deteriorate with the use of aluminum trihydrate as a filler material, the low cost thereof constitutes a sufficiently compensating factor of commercial practicality which does allow its use as a filler material for such purposes.

Where borate compounds are employed as flame retardants for resins, the structural strength of the cured resin article appears to be adversely affected by their inclusion. Hence, the use of such borate materials in an attempt to attain one advantage in resins is counteracted by concomitant disadvantageous results more basic to the very purpose of such resins, i.e. structural strength.

Hence, while normally solid inorganic flame retardants such as borates, aluminum trihydrate, etc., normal liquid organic chemical flame retardants, and various filler materials have been suggested for use in certain resinous fields, e.g. polyesters, urethanes, etc., it appears that the ultimate cured resin article is thereby either adversely affected in its physical and/or chemical properties or is only rendered moderately flame retardant, or both. In almost all cases, the amount of smoke developed on burning is still a major problem and reflects the practical inadequacy of the flame retardant additive cured resin systems presently available.

In this regard, U.S. Pat. No. 3,816,307, to Woods, utilizes finely divided borates such as hydrated sodium borates or boric acid in fiber-glass reinforced plastics, e.g. unsaturated polyester, to impart fire retardancy to the cured resin products. No ground glass powder is included in the formulation and the problem of smoke retardancy is nowhere considered. The use of sodium borate is said to decrease gel time and increase hardness but such hardness is limited to its measure as a degree of cure of the resin and in turn its resistance to water as determined by borate loss in the leach water.

U.S. Pat. No. 3,697,575, to Naarmann et al., concerns organic boric esters used to form flame retardant copymers with plastics such as polyester for laminating wood boards. No ground glass powder is included in the copolymer mass, nor is the problem of smoke retardancy considered. This teaching intimates that boric acid and borax as flame retardant additives have an adverse effect on the mechanical properties of plastics.

U.S. Pat. No. 3,317,455, to Blome et al., teaches that flame retardant rigid or flexible sheets or coatings for substrates may be provided upon incorporating boric acid into flexible silicone resin. Cellular particles such as glassy spheres may be included to reduce thermal conductivity and weight, and potassium titanate fibers are provided to stop thermal radiation and heat transfer. Other includable fibers such as asbestos, and other possible fibers having similar properties include glass fibers, zirconia fibers, glass flakes (ground), and alumina flakes. Common glass spheres or plastic spheres may be used when an ablation environment is not present. Also, inert substances such as $Al_2O_3$, $TiO_2$, and $SiO_2$, can be added without materially affecting the properties. No finely ground solid powder particles of soda-containing silicate glass in fractured, high and irregular surface area form in a particle size below about 40 mesh is contemplated nor is the problem of smoke retardancy considered.

U.S. Pat. No. 3,639,299, to MacDowall et al., incorporates insoluble alkaline earth borates, in preference to water soluble alkali metal borates, as flame retardants in elastomeric halogenated copolymers of vinylidene fluoride and halogenated lower aliphatics as resinous binder for providing resin coatings. Alkali metal borates are stated as generally to be avoided because they cause softening of the coating in damp or high humidity atmosphere, and various known flame retardant formulations are noted to be objectionable in releasing noxious gases upon burning. Hollow glass microballons containing a major proportion of alkali silicate provide thermal insulation when included in the resin coating. No finely ground solid powder particles of soda-containing silicate glass in fractured, high and irregular surface area form is contemplated.

U.S. Pat. No. 3,740,358, to Christie et al., employs finely divided boric acid, boric oxide or complexes thereof with hydroxy organic compounds as flame retardants in phenolic resole foams. The presence of an acid catalyst, silicic acid and aluminum oxide or hydroxide, or other metal oxides and hydroxides normally used in production of boron glasses, is said to cause glass to form on burning based on the boron and silica present. No ground glass powder is used in the formulation or is the problem of smoke retardancy considered.

U.S. Pat. No. 3,875,106, to Lazzaro, incorporates sodium, potassium and ammonium borates or boron oxide into epoxy or other resin as flame retardant in providing resinous coatings. Silica fibers, e.g. quartz, flint or borosilica, e.g. borosilica microballons, or silicate fibers such as aluminum and magnesium silicates and E-glass are also included in the coatings, and it is indicated that, upon heating, the boron compound melts and fuses with the silica or silica fibers and forms a net which holds the char layer formed by combustion of the resin to protect the substrate. The silica fiber is preferably synthetic leached high silica fiber glass. The salts employed in the coating are preferably alkali free, especially where the ablative coating is required to have a very low alkali content. No finely ground soda-containing silicate glass powder particles of fractured, high and irregular surface area form are contemplated nor is the problem of smoke retardancy considered.

U.S. Pat. No. 3,705,127, to Cyba, provides flame retardant haloarylimides of polyhalo substituted polyhydropolycyclic dicarboxylic acids as additives to plastics such as polyesters, optionally also containing other flame retardant agents including boric acid. No ground glass powder is contemplated nor is the problem of smoke retardancy considered.

U.S. Pat. No. 3,705,128, to Knowles, provides halogenated polyesters and polyvinyl chloride containing amide complexes of boron halide for flame resistant polymers, e.g. polyesters, optionally containing other flame retardants such as zinc borate. No ground glass powder is contemplated nor is the problem of smoke retardancy considered.

U.S. Pat. No. 2,744,291, to Stastny et al., provides for the production of porous foam plastic articles which may contain additional substances which yield incombustible gases upon burning, such as borates. No ground glass particles are contemplated nor is the problem of smoke retardancy considered.

U.S. Pat. No. 2,912,392, to Stilbert, Jr., et al., includes sodium borate in the covering layer of fiber board as a spumific agent. No ground glass particles are contemplated nor is the problem of smoke retardancy considered.

U.S. Pat. No. 3,245,870, to Orth, Jr., et al., includes boric acid, borates and the like in soft wood pulp to make flame retardant fiber board. No ground glass particles are contemplated although the problem of smoke generation is considered.

U.S. Pat. No. 3,635,847, to Evans et al., concerns a protective plastic coating which may contain boric acid for burn resistance in connection with explosive materials. No ground glass particles are contemplated nor is the problem of smoke retardancy considered.

U.S. Pat. No. 3,836,507, to Yoshizawa et al., concerns phosphorous flame retardants for plastics such as polyesters. Boric acid salts are recognized as flame retardants. No ground glass particles are contemplated nor is the problem of smoke retardancy considered.

In contrast to the mere filler function of aluminum trihydrate in resinous materials such as polyester, it should be noted that as disclosed in U.S. Pat. No. 4,016,131, issued Apr. 5, 1977, for PREPARATION OF UNSATURATED POLYESTER COMPOSITIONS, to Thomas C. Shutt and L. Wayne Snider, the use in admixture with unsaturated polyester of specifically constituted substantially pre-cleaned, dry and moisture-protected, fractured, active, finely ground powder particles of soda-containing silicate glass, especially soda-lime-silicate glass, having a high and irregular surface area, an average particle size below e.g. about 40 mesh and an active cured polyester structurally reinforcing property, represents a unique instance in which the glass additive functions not as a mere filler but as an active cooperating agent leading to enhancement of the physical and chemical properties of the polyester resin with consequent attendant advantages.

On the other hand, the particulate glass serving as an active cooperating agent according to said U.S. Pat. No. 4,016,131 cannot be art-regarded as a true flame retardant as so used or even where intended as a mere glass filler in polyester formulations any more than conventional glass or other filler material is so art-regarded. Nor is this an instance where the problem of smoke generation is concomitantly avoided.

Because it may be estimated that at least about 20% of the present polyester market alone requires the use of flame retardant materials, and because the philosophy behind existing governmental legislation and regulation portends the continued increase in the portion of resinous materials such as polyesters, urethanes, etc. which will be required in due course to possess flame retardant properties, and because of the conjoint problem of smoke generation during resin burning, a clear demand presently exists for smoke and flame retarding conjoint agents which are broad in application, rather than specific as in the case of the known liquid flame retardants. Such smoke and flame retarding conjoint agents should also be such as do not in combination detract from the chemical and physical properties of the resinous material as is the case for instance with aluminum trihydrate, or even borates alone, nor which disturb the active cooperating agency constituted by the above-noted particulate glass according to said U.S. Pat. No. 4,016,131 or the mere filler role of conventional glass or the other known filler materials. Moreover, the broad application smoke and flame retarding conjoint agents understandably should be readily available in industrial scale commercial quantities at practical inexpensive cost, relatively inert and non-toxic in handling and use, preferably should be inorganic in nature, of natural mineral origin, and easily storable and transportable, and in particular should be in a form in situ within the cured resin mass permitting effective smoke as well as flame retardancy under the actual conditions of burning which may be expected or encountered.

It is among the objects and advantages of the present invention to overcome the above-mentioned drawbacks and disadvantages of the known flame retardants in resinous materials, and to provide smoke and flame retarding conjoint agents of improved effectiveness and broad application among the various contemplated resinous materials such as polyesters, urethanes, and the like, and especially which do not detract significantly from the attendant chemical and physical properties of the resinous material in question when used therewith.

It is among the further objects and advantages of the present invention to provide smoke and flame retarding conjoint agents of the foregoing type which are readily available in industrial scale commercial quantities, especially at practical inexpensive cost, and which are relatively inert and non-toxic in handling and use, as well as inorganic in nature, of natural mineral origin, and easily storable and transportable.

It is among the still further objects and advantages of the present invention to provide such smoke as well as flame retarding conjoint agents which are in a form in situ within the ultimately cured resin mass, permitting improved smoke and flame retardancy under the actual conditions of burning which may be expected or encountered, and especially which under such burning conditions includes a flame retardant component which is capable of releasing molecularly bound water which may be present for directly retarding or suppressing the burning action and/or of forming an interfacial or interstitial inert composite shield or barrier at the burning site, serving to insulate the cured resin surface thereat against heat and fire and prevent further oxidative reaction from taking place, aside from conjoint retardation or suppression of attendant generation of smoke during the actual burning of the resin.

It is among the additional objects and advantages of the present invention to provide such smoke and flame retarding conjoint agents for incorporation into the corresponding resin in intimate and substantially uniform distribution therein to form an admixture therewith prior to curing and in a conjointly effective overall amount for imparting active smoke and flame retarding properties to the cured resin, and especially to provide methods for preparing, and admixture compositions so-prepared, of such a resin, fractured finely ground solid powder particles of soda-containing silicate glass, especially soda-lime-silicate glass, having a high and irregular surface area and an average particle size below about 40 mesh, and a finely divided inorganic solid oxidic boron material, especially borate, having an average particle size below about 40 mesh, in such conjointly effective amounts as such smoke and flame retarding conjoint agents and which boron material is capable of forming inert glass upon being heated, and preferably yet optionally combining fiber-glass therewith before curing.

Other and further objects of the present invention will become apparent from a study of the within specification and accompanying examples.

Briefly, the present invention, according to one aspect thereof, concerns a composition for providing improved smoke and flame retardant, high structural strength resinous products comprising an admixture of resin, fractured finely ground solid powder particles of soda-containing silicate glass, especially soda-lime-silicate glass, having a high and irregular surface area and an average particle size below about 40 mesh, and a finely divided inorganic solid oxidic boron material or compound; such as a sodium borate, e.g. sodium tetraborate (anhydrous, pertahydrate or tetrahydrate); or boric acid; or boron oxide; or mixtures thereof; capable of forming inert glass upon being heated. Such boron material or compound is suitably present in an effective amount for imparting an active flame retarding property to the cured resin, and the boron material and particles of glass are correspondingly present in a combined effective amount for imparting conjointly an active smoke retarding or suppressing property to the cured resin in addition to flame retardancy.

The invention also contemplates a method comprising curing a composition of the stated type such as one combined with fiber-glass to form a corresponding ultimately cured resin high structural strength composite product such as a fiber-glass reinforced plastic product.

Furthermore, the present invention, according to another aspect thereof, concerns a method for imparting smoke and flame retardancy to resinous products comprising incorporating such fractured finely ground solid powder particles of soda-containing silicate glass and such an inorganic solid oxidic boron material capable of forming inert glass upon being heated into the corresponding resin in intimate and substantially uniform distribution therein to form an admixture therewith prior to curing and in corresponding effective amounts for conjointly imparting such active smoke and flame retarding properties to the cured resin in addition to flame retardancy.

The inorganic solid oxidic boron material, capable of forming inert glass upon being heated, which constitutes the salient flame retarding agent according to the invention, may generally be a sodium borate, such as sodium tetraborate (hydrated or anhydrous), or boric acid ($H_3BO_3$), or boron oxide ($B_2O_3$), or mixtures of two or more of such substances in any desired appropriate proportions. Nevertheless, due to its much lower cost and excellent performance characteristics sodium tetraborate is preferred.

It will be realized that the term inorganic solid oxidic boron material is not intended to be limited to oxides but instead generically connotes herein the presence of oxygen in the inorganic solid boron material or compound in question.

The sodium tetraborate may be in the form of its hydrate, i.e. in a form containing releasable molecularly bound water, or, although less preferred, even in its anhydrous form ($Na_2B_4O_7$). Among such hydrate forms are the decahydrate ($Na_2B_4O_7 \cdot 10 H_2O$) and the pentahydrate ($Na_2B_4O_7 \cdot 5 H_2O$), both of which are readily available. However, due to its extremely high or maximum content of molecularly bound water and commercially attractive cost and availability, the decahydrate is most preferred.

The inorganic solid oxidic boron material is advantageously utilized in finely divided form, preferably having an average particle size below about 40 mesh and more preferably below about 325 mesh. Such flame retarding agent, preferably sodium tetraborate, is desirably present in an amount of at least about 1%, and preferably 2–25%, more preferably 10–20% and especially 10–15%, by weight of the resin/glass/flame retarding agent admixture for significant effective results.

As regards the resin component, at least about 1%, and generally for obvious reasons of economy at most about 50%, of the flame retarding agent component will be present, based on the total combined weight of the resin and flame retarding agent. Nevertheless, the preferred range of 2–30%, especially 10–30%, e.g. 10–20% or 20–30%, by weight, based on the combined weight of the resin and boron material components, will normally be employed for the flame retarding agent for adequate results as among the various resins, regarding flame retardancy, for example in connection with unsaturated polyester resins, although the broader range of 1–50% of such flame retarding agent based on the combined weight of the resin and boron material may still be used.

The resin may of course be any conventional resin such as the usual commercial synthetic plastics, all of which are subject to sustained burning upon catching fire. These include for example polyesters, especially unsaturated polyesters, vinyls, urethanes, styrenes, nylons and the like of the most varied type, all of which are well known and need not be more specifically enumerated. The significance is that they all support combustion or sustain it at comparatively low burning temperatures whereas the instant inorganic solid oxidic boron material, by its very nature possessing the property of being capable of forming inert glass upon being heated, imparts flame retardancy thereto by what appears to be an "in situ" mechanical shielding at the vicinal interfacial and interstitial local areas or points o contact therebetween otherwise exposed to the action of combustion. Hence, the particular type of resin is generally of no decisive consequence because of the apparent broad applicability of such inherent flame retarding mechanism or action to all appropriate readily combustible resins.

Advantageously, the desired imparting of flame retardancy by the boron material component of the invention is not in any way adversely affected by the presence of the fractured finely ground solid powder particles of soda-containing silicate glass, or by the usual other components such as fillers, reinforcing fiber-glass, and the like which are often present in the resin formulations used to provide these resinous products. Instead, surprisingly not only is effective flame retardancy imparted to the cured resin by the boron mateials but also the conjoint presence therewith of the glass particle component serves to provide smoke retardancy or suppression as well. These conjoint effects are not significantly attained in the absence of the two components together in the cured resin. Hence, their conjoint presence may be deemed surprisingly synergistic for achieving these conjoint effects.

Thus, the admixture of resin and boron material as flame retarding agent advantageously includes finely ground powder particles of soda-containing silicate glass, especially soda-limesilicate glass, for achieving smoke retardancy conjointly therewith, and preferably those having an average particle size below about 40 mesh and more preferably below about 325 mesh. The glass particle component may be present generally in amounts of at least about 1%, and prefereably 15–40% or 15–38%, more preferably 20–35% and especially 20–30%, by weight of the resin/glass/flame retarding agent admixture.

As regards the resin component, at least about 1%, and generally for reasons of structural strength and efficiency at most about 60%, of the glass particle component will be present, i.e. based on the combined weight of the resin and glass particles. Nevertheless, the preferred range of 15–45%, especially 20–40%, e.g. 20–30%, 30–40% or 25–35%, by weight based on the combined weight of the resin and glass particle components will normally be employed for adequate results as among the various resins, especially unsaturated polyester resins.

The resin component may be advantageously loaded with the boron oxidic material component and the glass particle component to the extent of a combined amount of the latter two components of between about 25–50%, preferably 30–45%, especially 30–40%, or 35–40%, by weight of the three component admixture. Generally, such combined amount at 25–30% by weight is less effective due to the lower content of loading ingredients whereas at 40–50% by weight such combined amount is less effective due to the high content of such loading ingredients, i.e. compared to the quantity of the basic resin component itself. Hence, the most advantageous results occur where the combined effective amount is 30–40%, especially 35–40%, by weight of the admixture.

In this regard, as between the boron oxidic compound and the glass particles in such combined effective amount, for increased conjoint flame and smoke retarding purposes while retaining effective structural properties in the finally cured composite product, between about 15–40% or 15–38%, more preferably 20–35%, and especially 20–30%, by weight will be represented by the glass particle component, and concordantly between about 25–2%, more preferably 20–10%, and especially 15–10%, by weight will be represented by the boron oxidic compound component.

Other conventional filler materials, of course, may also be included for their usual desired purposes and in similar conventional amounts as appropriate.

Where fiber-glass is employed in the resin formulation, e.g. in the usual conventional amounts such as in the weight ratio range of about 50–90% resin to about 50–10% fiber-glass, the resin formulation upon curing will produce the corresponding cured resin composite product, i.e. a fiber-glass reinforced plastic product. Based on these two ingredients, the fiber-glass content will be preferably 10–35% or 10–30%, e.g. 25–35% or 30–35%, by weight of the total thereof.

Considering the four component system of resin, boron oxidic compound, glass particles and fiber-glass, on a concordant total weight basis, the resin is preferably present in an amount of 45–55%, especially 45–50%, the boron oxidic compound is preferably present in an amount of 20–2%, especially 15–5%, the glass particles are preferably present in an amount of 15–35%, especially 15–25%, and the fiber-glass is preferably present in an amount of 30–10%, especially 25–15%. Of this total amount, the boron oxidic material and glass particles are desirably present in an amount of 25–40%, especially 25–35%, by weight, for best results.

Where the resin is unsaturated polyester, the improved smoke and flame retardant composition product upon curing will be beneficially conjointly improved by the specific provision therein of the particulate glass according to said U.S. Pat. No. 4,016,131, i.e. where the particles of glass included in the resin formulation along with the resin and instant flame retarding agent admixture are substantially pre-cleaned, dry and moisture-protected, fractured, active, finely divided powder particles having a high and irregular surface area, an average particle size below about 40 mesh and an active cured polyester structurally reinforcing property. Such compositions, especially when combined with fiber-glass before curing, result in fiber-glass reinforced plastic products not only of improved physical and chemical properties but also of conjoint improved smoke and flame retardancy as well.

One particularly preferred composition comprises an intimate admixture in the form of a substantially uniform dispersion of synthetic resin, such as unsaturated polyester or a urethane or the like; sodium tetraborate, such as that which contains molecularly bound water, especially finely divided sodium tetraborate decahydrate, having an average particle size below about 40 mesh, and preferably below about 325 mesh; and fractured finely ground solid powder particles of soda-containing silicate glass, such as soda-lime-silicate glass, having a high and irregular surface area and an average particle size below about 40 mesh, and preferably below about 325 mesh, especially substantially pre-cleaned, dry and moisture-protected, fractured, active, finely ground solid powder particles of soda-containing silicate glass, such as soda-lime-silicate glass, having a high and irregular surface area and an active cured resin structurally reinforcing property, especially in the case where the resin is unsaturated polyester; and optionally but preferably fiber-glass. Accordingly, upon curing the admixture combination, e.g. in the above-stated amounts, the corresponding cured composite resinuous product such as a fiber-glass reinforced plastic product will be formed having the aforesaid improved smoke and flame retardancy properties and high structural strength, and as the case may be the conjointly improved physical and chemical properties for a fiber-glass reinforced polyester plastic product.

The utilization of such ingredients thus embraces broadly according to a further feature of the invention a method for imparting smoke as well as flame retardancy to resinous products comprising incorporating fractured finely ground solid powder particles of soda-containing silicate glass, especially soda-lime-silicate glass, having a high and irregular surface area and an average particle size below about 40 mesh, and a preferably similar mesh size finely divided or powder particle form inorganic solid oxidic boron material capable of forming inert glass upon being heated, of the foregoing type, especially sodium tetraborate, such as that which contains molecularly bound water, and more especially the decahydrate, into the corresponding resin of the foregoing type, especially unsaturated polyester, in intimate and substantially uniform distribution therein to form an admixture therewith in the form of a substantially uniform finely divided dispersion therein prior to curing and in an effective conjoint amount for imparting an active smoke as well as flame retarding property to the cured resin.

Such method also preferably contemplates incorporating into the admixture prior to curing in the aforesaid amounts as the finely ground solid powder particles of soda-containing silicate glass of the foregoing type, soda-lime-silicate glass having an average particle size below about 40 mesh, and preferably below about 325 mesh, and especially substantially pre-cleaned, dry and moisture-protected, fractured, active, finely ground solid powder particles having a high and irregular surface area and an active cured polyester structurally reinforcing property in the case where the resin is unsaturated polyester, whereby to provide an active extender glass particle component to the system.

Furthermore, such method optionally but preferably additionally contemplates, whether or not other components such as conventional fillers are present, combining the particular admixture-composition with fiber-glass in the aforesaid amounts prior to curing.

Accordingly, upon curing the admixture-combination, e.g. in the above-stated amounts, the corresponding cured composite resinous product of the foregoing type will be formed having the aforesaid improved smoke and flame retardancy properties. Such improved smoke and flame retardancy properties will be provided irrespective of and independent of any conjointly improved physical and chemical properties which may be imparted by the preferred selective inclusion in the admixture, as the glass component thereof, of such active extender glass particles of the foregoing type in the above-stated amounts, especially where the resin component comprises unsaturated polyester, and/or by the optional selective combination therewith of fiber-glass in the above-stated amounts to provide fiber-glass reinforced resinous or plastic products, especially of the polyester type where the resin component comprises unsaturated polyester.

Advantageously, despite the fact that the anhydrous form of sodium tetraborate and boron oxide do not contain ay associated molecularly bound water, these particular resinous product additive species of the inorganic solid oxidic boron material or compound capable of forming inert glass upon being heated, are nevertheless appropriate for imparting smoke and flame retardancy conjointly with the glass component according to the present invention. On the other hand, to the extent that molecularly bound water is present in the instant oxidic boron material, of course, attendant increased smoke and flame retarding properties are provided inherently. In this regard, it has been surprisingly found that unlike the mere predictable role of the aforesaid known inorganic solid flame retardants such as boron materials, aluminum trihydrate, etc., the instant smoke and flame retardant agents conjointly function in a manner which cannot merely be explained in terms of contributing releasable water molecules to the "in situ" active site of resin oxidation for simple quenching mechanism effect.

While the reasons for the surprising results and effects of the conjoint utilization of the instant inorganic solid oxidic boron material and glass particle component according to the invention as smoke and flame retarding agents in connection with curable resins or plastics are not fully understood at this time, the following explanation is set forth by way of illustration and not limitation as a plausible basis therefor, it being pointed out that the same is not intended in any way as an indication or representation of the actual mechanism involved but merely as a proffered constructive theoretical description, currently considered to be appropriate, of what apparently occurs.

Typically optimum results occur with the use of sodium tetraborate decahydrate, e.g. borax. This substance contains 47% by weight of associated water in molecularly bound form. This water is progressively liberated, or heat-released, at comparatively low transitional temperatures, i.e. within the range of incremental temperature gradients as normally encountered in burning:

1. At 62° C.: $Na_2B_4O_7 \cdot 10H_2O \rightarrow Na_2B_4O_7 \cdot 5H_2O$
2. At 130° C.: $Na_2B_4O_7 \cdot 5H_2O \rightarrow Na_2B_4O_7 \cdot 3H_2O$
3. At 150° C.: $Na_2B_4O_7 \cdot 3H_2O \rightarrow Na_2B_4O_7 \cdot 2H_2O$
4. At 180° C.: $Na_2B_4O_7 \cdot 2H_2O \rightarrow Na_2B_4O_7 \cdot 1H_2O$
5. At 318° C.: $Na_2B_4O_7 \cdot 1H_2O \rightarrow Na_2B_4O_7 \cdot$ (anhydrous)

Calculation of the latent heat of vaporization of water molecules from the decahydrate or lower hydrate forms reveals that although sensible heat must be absorbed from the burning resin material such as cured polyester, as the water molecules are liberated, the quantity thereof would have been impossible to absorb sufficient sensible heat to stop the burning altogether. Hence, although it might have been preliminarily thought that the mechanism of water loss alone would be successful in producing desired smoke and flame retarding action, and although in fact the particular water loss in the case of this specific compound, to wit, the decahydrate, obviously contributes most effectively in actually retarding the spreading of the flame, i.e. in a relative sense, the loss of water cannot by itself account for the complete extinguishing of the flame, i.e. in an absolute sense, along with attendant smoke retardation in conjoint association with the glass particle component.

In this connection, to those skilled in the art, it is well understood that sodium tetraborate is a natural glass forming material. Generally speaking, the only natural glass forming materials known to man are considered to be limited to six in number, namely, the oxgyen-containing materials: silica; germanium oxide; the instant inorganic solid oxidic boron compounds such as sodium borates, e.g. sodium tetraborates, as well as boric acid and boron oxide; phosphorus pentoxide; and to a lesser extent, $V_2O_5$ and $As_2O_3$, which may also be considered as glass formers.

Of these six main natural materials, only the instant inorganic solid oxidic boron compounds, i.e. sodium borates such as sodium tetraborate, as well as boric acid and boron oxide, form a glass below about 741° C. Since the flame temperature of burning resin, such as polyester, is generally about 741° C., sodium borate, boric acid and/or boron oxide in admixture therewith according to the invention will inherently form a glass "in situ" at the resin-sodium borate or boric acid or boron oxide burning site. In such state, like all glasses, this nascent or incipient "in situ" formed glass will be able to flow, and in the vicinal environment in question this nascent flowable glass, as well as that in the immediate area of the also present finely ground solid powder particles of the soda-containing silicate glass component, will be available at the immediate burning site to so flow through the porosity of the cured resin matrix, e.g. of the polyester, and join up and blend with itself and with the particles of the soda-containing silicate glass component. This intermingling of flowing "in situ" formed glass with itself will thus occur along and through the interfacial and interstitial local areas of the inherently porous cured resin and silicate glass component matrix and among the interlayers thereat, especially considering the intimate spatial relation between the resin and the glass particles and sodium borate, boric acid and/or boron oxide substantially uniformly dispersed and distributed therein, i.e. in terms of the precursor orientation of the basic three component admixture composition used to produce the cured resin.

Upon such joining up with itself, or coalescing, the resulting oxidic boron compound-supplied glass film or layer covers over the active burning site or sites of the cured resin as a kind of network conjointly with and at the fractured glass particle active surfaces, and according to the invention surprisingly acts rather like a composite shield or barrier against further combustion reaction and smoke generation thereat. This is believed to occur because the "in situ" formed glass is inert rather than capable of sustaining further combustion reaction and the same is true of the intimately arranged glass particles therewith in the cured resin. Thus, neither component is affected adversely by the burning flame and both conjointly blend and serve to arrest smoke and flame generation and propagation. Accordingly, the otherwise self-sustaining burning flame of the resin, e.g. polyester, extinguishes completely as soon as it reaches the smothering "in situ" glass shield or barrier, likewise suppressing further smoke generation as well.

Although not completely understood at this time, and by way of possible further theoretical non-limiting explanation, it is believed that the high and irregular surface area contributed by the fractured and substantially small particle size nature of the solid powder particles provides active surface sites for attendant portions of or constituents in the soda-containing silicate glass to interact or interreact or at least physically blend and coalesce under actual burning conditions and attendant generated heat, with the nascent boron-containing glass as it forms is situ thereat, thus forming more robust, ubiquitous intimately distributed glass network arrangements throughout the matrix system, far more effective and intensive as a conjoint agency for retarding, arresting and suppressing not only further resin burning but also attendant smoke generation as well.

Because of the apparently independent physical-chemical manner in which the instant smoke and flame retarding conjoint agents function primarily in achieving their desired effect, involving the "in situ" formation of an inert glass film or layer serving as a smoke-arresting and flame-arresting or extinguishing shield or barrier against further resin burning, the glass particle component and inorganic solid oxidic boron compound component in question will advantageously be applicable for incorporation in all correspondingly appropriate resin formulations made into resinous products which upon curing are susceptible to smoking and burning and/or which self-sustain burning and attendant smoke generation. This is true, of course, so long as the instant smoke and flame retarding agents are not thereby chemically modified or at least not adversely changed to such extent that they cannot perform conjointly their primary function of imparting improved smoke as well as flame retardancy to the ultimately cured resinous product.

As used herein, resins or plastics generally contemplate synthetic materials which are plastic in their precursor condition but which are ultimately cured to substantially rigid product form and, in addition to polyester resins and specifically unsaturated polyester resin as well as urethane or polyurethane resins generally include both thermoplastic synthetic type resins such as those formed by polymerization and thermosetting synthetic type resins such as those formed by condensation and polymerization accompanied by cross-linking. Among such thermosetting resins are the usual phenolics or phenol-aldehyde resins, amino-aldehyde or urea-formaldehyde resins, alkyd or glycerine-phthalate resins, and the like conventional resins, and among such thermoplastic resins are the vinyls or polyvinyl resins, polyvinylidine resin, styrene or polystyrene resins, polyamides, polyolefins, and the like conventional resins.

With specific reference to polyester resin, by way of illustrative example, it will be appreciated that unsaturated polyesters are commonly used today as bulk raw materials together with glass fibers or fibrous glass (for convenience herewithin termed "fiber-glass") to form composite structures generally referred to in the art as fiber-glass reinforced plastics (FRP). Inert fillers or extenders, e.g. silica, diatomaceous earth, etc., are often included in such compositions to reduce the overall material costs. The FRP industry is concerned with the fabrication of a wide range of composite products, for example, shaped articles such as boat hulls and other parts, bath and shower modules, storage tanks, etc.

The generic term "unsaturated polyester" (or polyester alkyd) is a convenient designation used in the art to describe many very similar organic resinous chemicals usable as such bulk raw materials in the FRP industry. Unsaturated polyesters chemically comprise a class of soluble, linear, low molecular weight macromolecules which contain both carboxylic ester groups and carbon-carbon double bonds as recurring units along the corresponding main chain. A typical such unsaturated polyester widely used in the FRP industry is the general purpose polyester (GPP) which has, after reaction has occurred, i.e. polymerization of curing, the following recurring unit linear molecular structure:

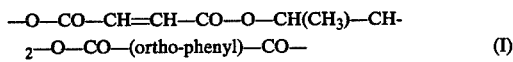
—O—CO—CH=CH—CO—O—CH(CH₃)—CH₂—O—CO—(ortho-phenyl)—CO—      (I)

During recent years, many hundreds of thousands of tons of unsaturated polyesters have been used for the manufacture of FRP items. In connection with such manufacture, when the two basic raw materials employed. i.e. unsaturated polyester and fiber-glass, are mixed together, usually in the proportion of polyester to fiber-glass of about 65–70:35–30 parts by weight, they form a strong, inert material or composition product upon curing. Such curing is usually carried out by adding to the mixture a conventional curing catalyst for unsaturated polyester such as an organic peroxide. FRP systems combine the superior chemical properties of the generally linear polyester resins with the superior physical or mechanical reinforcing properties of fiber-glass. As a consequence, the relatively physically or mechanically weak polyester, which has good chemical corrosion and water resistance properties, is made considerably stronger by the addition of fiber-glass, for instance in a reinforcing amount of approximately 30 to 35% of the mixture.

For many applications a general purpose polyester, such as that noted above, will suffice. However, there are numerous applications in which a more specialized polyester must be used. Such will be the case, for example, where higher resistance to chemical corrosion or to water is needed or where greater fire retardation properties are required. In order to achieve such improved properties in the system, either an isophthalic polyester or a bisphenol fumarate polyester may be typically employed.

The corresponding recurring unit linear molecular structures for these specialized polyesters respectively are as follows:

ISOPHTHALIC POLYESTER

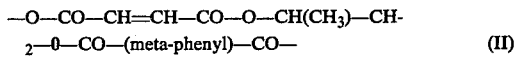
—O—CO—CH=CH—CO—O—CH(CH₃)—CH₂—O—CO—(meta-phenyl)—CO—      (II)

BISPHENOL FUMARATE POLYESTER

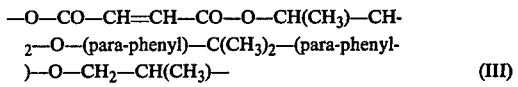
—O—CO—CH=CH—CO—O—CH(CH₃)—CH₂—O—(para-phenyl)—C(CH₃)₂—(para-phenyl)—O—CH₂—CH(CH₃)—      (III)

It should be noted that the improved chemical properties attained with the use of such isophthalic and bisphenol fumarate polyesters are generally attributed to the fact that, for a given recurring unit molecular length, there are fewer carboxylic ester linkages (—CO—O—) than in the general purpose polyester (cf. formulae II and III with formula I). It is well known in the art that the ester linkage is generally the weakest part of the polyester chain in that it is relatively easily hydrolyzed. Therefore, generally as the number of such ester linkages increases, the desired chemical properties will decrease in the cured resin.

Accordingly, where the resin component of the instant admixture is a polyester, it is preferably any conventional unsaturated polyester. Such unsaturated polyesters thus include all soluble, linear, low molecular weight macromolecules which contain both carboxylic ester groups and carbon-carbon double bonds as recurring units along the main chain. They contemplate, for example, unsaturated polyesters or polyester curable resins which contain polybasic unsaturated acid (e.g. unsaturated dicarboxylic acid) and alkyd (e.g. polybasic acid or anhydride-polyhydric alcohol condensate) recurring units or linkages such as fumarate and glyptal (e.g. glycerol-phthalic acid condensate) units or linkages. They also contemplate those which contain polybasic unsaturated acid (e.g. unsaturated dicarboxylic acid ) and bisphenol-alkylene ether recurring units or linkages such as furmarate and bisphenol-propylene ether units or linkages. In particular, such unsaturated polyesters include the general purpose polyester (GPP) of the formula I type and any specialized polyester of the formula II or formula III type.

Of course any known or conventional type fibrous glass or glass fiber material may be used as the optional fiber-glass component for mechanically or physically reinforcing the ultimate composition in the desired manner. Such fiber-glass material may constitute, for instance, glass fibers generally ranging in diameter from about 0.004 to 0.012 inch. Generally, they are flexible yet of relatively high tensile strength, non-flammable, and not normally affected by moisture or by most acids. They may be used in roving, chopped strand mat, fabric or other conventional form for impregnation by or mixing or combining with the resin admixture of the invention to achieve appropriate fiber-glass reinforced plastic products or articles of any desired shape and type. Such glass fibers or fiber-glass, generally only contribute strength and stiffness in the direction of their length to the finished article.

The proportion of resin such as polyester to fiber-glass optionally used according to the invention is conventional. Suitably, for instance, a weight ratio range of about 70 to 90% of resin to about 30 to 10% of fiber-glass may be employed, as aforesaid, depending on the purpose of the application. Naturally, other things being equal, the inherent properties of the cured polyester or other resin component in the system will depend upon the corresponding precursor properties in the particular starting unsaturated polyester or other resin selected.

The fractured finely ground solid powder soda-containing silicate glass particle component of the composite synergistic system of the present invention may be, for example, composed of solid powder particles (as distinguished from hollow spheres or microballoons) of any soda-containing silicate glass, especially soda-lime-silicate glass, new or used, or any mixtures thereof, including glass particles from any original or recycled source, e.g. bottles, window panes, jars, etc. The glass will contain a source of readily available sodium ions and preferably should also contain a source of calcium ions where the improved physical and chemical properties according to said U.S. Pat. No. 4,016,131 are desired in the ultimately cured resin.

While the present invention broadly contemplates the inclusion of sodium-containing borosilicate type glass, for example, as a solid powder particulate glass ingredient, nevertheless since this type of glass which has a comparatively low available sodium content, does not appear to be optimally operative to give the more outstanding improved results according to said U.S. Pat. No. 4,016,131 which are generally obtained with soda-lime-silicate glass, as based upon information to date, soda-lime-silicate glass will be the presently preferred and most suitable type glass component contemplated herein, and will be used in preference over borosilicate glass for that purpose.

It will be realized of course that such borosilicate type particulate glass is already in glass form as distinguished from the instant inorganic solid oxidic boron material which is a precursor and which as a natural glass former only forms glass during the actual resin burning.

The glass intended for inclusion, especially when in the form of such active extender component, according to the invention must be washed clean if necessary and dried before use. The clean glass is then crushed and milled, as appropriate, in the conventional manner, preferably in the absence of moisture, to produce a very finely ground solid (as distinguished from hollow sphere or microballoon) particle powder of inherently high and irregular surface area. This product is screened to obtain the desired average particle size fraction. If not immediately used, the finely milled and screened glass powder is desirably maintained in the presence of a suitable desiccant such as silica gel, so that it cannot be attached by moisture. In any case, the ground particles of glass should be in substantially dry condition when used, especially since the presence of moisture is generally considered detrimental to the basic system of this preferred active extender glass component feature. This is perhaps due to the fact that, other things being equal, moisture promotes hydrolysis e.g. of the carboxylic ester groups in the polyester resin during resin curing which leads to the weakening of the entire structure.

However, due to the molecularly bound or otherwise combined nature of any water content in the instant boron material flame retarding agents, such water will in no way adversely affect the primary functioning of the moisture-protected glass particles in the basic system of this preferred active extender glass component feature prior to or during resin curing.

The inorganic, preferably finely divided, solid oxidic boron material particles constituting the basic flame retarding agent, in an effective amount for imparting an active flame retarding property to the ultimate cured resin composite product, and the particles of the glass component in the desired amount, i.e. in an amount correspondingly with the basic boron material flame retarding agent to provide a combined effective amount for imparting an active smoke retarding property as well to the cured resin, and in substantially dry condition in accordance with this particular feature of the invention, are intimately admixed with the resin, e.g. a normally liquid unsaturated polyester, i.e. in any desired sequence or simultaneously, or are premixed with each other and then with the resin, preferably under shearing force, as by intense stirring, to achieve ultimately a uniform dispersion in which the instant boron material as basic flame retarding agent, and the fractured finely ground solid powder glass particles are evenly distributed throughout and intimately mixed and/or wetted as the case may be with the precursor resin matrix. A curing agent or catalyst such as methyl ethyl ketone peroxide as in the case of unsaturated polyester is then added in the conventional manner. The admixture is allowed to cure as is, or if it is to be fiber-glass reinforced, the admixture and fiber-glass are combined before resin curing has set in.

In this regard, the four major methods of FRP fabrication, namely, lay-up (hand or spray gun), filament winding, casting and molding, may all employ the resin/flame retarding agent/finely ground glass admixture according to the invention. The instant admixture or composition is handled in exactly the same way that the resin without the boron material as basic flame retarding agent of the invention and/or without the particulate glass component would be handled, i.e. in applying the same to the fiber-glass.

An average particle size of below about 325 mesh (i.e. below about 0.044 mm.) is generally the most commonly employed particulate glass fraction size. This is because in laying-up most FRP items, a spray gun is used which necessitates in turn the use of a finely divided glass filler or extender. In fact, the spray gun apparatus is usually designed to admix the curing catalyst into the resin/extender mixture so that the gun nozzle assembly supplies a curable condition mix to the fiber-glass. The fiber-glass is often supplied as chopped lengths from a continuous strand at the gun nozzle vicinity so as to be wetted, impregnated and/or combined with the resin/extender/catalyst mix by this lay-up technique.

Nevertheless, in the other methods of lay-up, much coarser glass particle sizes may be employed. In particular, it has been found, for example, that glass material of below about 40 mesh (i.e. below about 0.44 mm.) average particle size is especially applicable in hand-lay-up work. Of course, depending upon the results sought other coarse or finer particle sizes may also be employed. An intermediate average particle size of below about 200 mesh (i.e. below about 0.074 mm.), for instance, is suitable for many applications. A corresponding particle size for the instant boron material is generally to be preferred, and is accordingly utilized.

Understandably, aside from the role of the instant boron material as basic flame retarding agent, the properties that result from the conjoint inclusion therewith of the fractured finely ground solid powder particles of soda-containing silicate glass in the instant admixtures will vary with the type of resin utilized, the amount of glass particles based on the resin content, the average particle size of such glass, the proportion of resin to fiber-glass in the system, and the like. However, one specific property or factor which is greatly improved by the presence of the finely ground glass as an active extender according to said U.S. Pat. No. 4,016,131 concerns the "roll-out" time of the finished FRP unit being produced. This roll-out time is the time taken manually to smooth out the workpiece, remove all air bubbles, etc. When using the instant compositions or admixtures, such roll-out time is reduced to about 30 to 60% as compared with that for the normal polyester or polyester/conventional extender systems heretofore used. The presence of the instant flame retarding agent in no way adversely influences this desired effect.

The following examples are set forth by way of illustration and not limitation.

EXAMPLE I

To produce a corresponding cured FRP product, a portion of the corresponding inorganic solid oxidic boron compound, i.e. $Na_2B_4O_7 \cdot 10H_2O$, $Na_2B_4O_7 \cdot 5H_2O$, $Na_2B_4O_7$ (anhydrous), $H_3BO_3$ or $B_2O_3$, as the case may be, is added in fine particle form, i.e. having an average particle size below about 325 mesh, in an appropriate amount effective for imparting an active cured resin flame retarding property, to a pre-weighed quantity of liquid unsaturated polyester (general purpose polyester of formula I type: Alpha 52-59 FFR-2 orthophthalic unsaturated polyester, Alpha Chemical Co.) in the proportions noted in Table 1 below. The resulting mixture is stirred for about 5 minutes or more to effect thorough and intimate mixing under the shearing force of the impeller blade of the stirrer. A uniform dispersion is produced in which the particles of flame retarding agent are evenly distributed throughout the polyester mass. This polyester/flame retarding agent admixture is then combined with 2% methyl ethyl ketone peroxide as curing catalyst and a reinforcing amount of fiber-glass in the weight ratio of polyester-flame retardant admixture to fiber-glass of 70:30. The resulting composite is cured in the conventional manner at 70°-75° F. for about 24 hours.

Sample cured products in plate form, omitting the fiber-glass, are separately produced according to this procedure from corresponding admixtures of unsaturated polyester and each of the above inorganic solid oxidic boron compounds, and a comparison control cured product in plate form is separately produced from unsaturated polyester alone. Based on a combined total of 200 parts by weight of resin and $Na_2B_4O_7 \cdot 10H_2O$, in various individual amounts, the sample cured products in plate form so produced are tested against a comparison sample cured product in plate form of 200 parts by weight of such resin alone and without any flame retarding agent, as to their burn rates. Typical results are set forth in Table 1 below.

EXAMPLE II

The procedure of EXAMPLE I is repeated but in this case adding the conventional solid flame retarding agent and filler, aluminum trihydrate, i.e. $Al(OH)_3$ or $Al_2O_3 \cdot 3H_2O$, correspondingly in fine particle form in an appropriate amount in producing the desired dispersion. The comparison burn rate results for the separately produced sample cured products in plate form are also set forth in Table 1.

EXAMPLE III (a) Soda-lime-silicate glass from any source (bottles, window panes, jars, etc.) is washed clean, then dried, crushed and milled in conventional manner to obtain predominantly particles having a particle size below about 325 mesh. The resulting powder is screened on a U.S.S. 325 mesh screen and the fractured solid powder particles of glass that pass through the screen (i.e. the minus 325 mesh fraction) are collected and bagged with silica gel as desiccant to prevent moisture contamination. This fraction having an average particle size below about 325 mesh is used as the finely ground soda-lime-silicate glass extender or component to be admixed with the unsaturated polyester or resin component and the instant boron material flame retarding agent component.

(b) To produce a corresponding cured FRP product, a portion of the collected fraction from (a) is added in an appropriate pre-weighed amount to a pre-weighed quantity of liquid unsaturated polyester (general purpose polyester of formula I type: Alpha 52-59 FFR-2 orthophthalic unsaturated polyester, Alpha Chemical Co.) already admixed with the appropriate inorganic solid oxidic boron compound according to the procedure of EXAMPLE I, i.e. $Na_2B_4O_7 \cdot 10H_2O$, $Na_2B_4O_7 \cdot 5H_2O$, $Na_2B_4O_7$ (anhydrous), $H_3BO_3$ or $B_2O_3$, as the case may be, in the proportions noted in Table 1. The resulting mixture is stirred for about 5 minutes or more to effect thorough and intimate mixing under the shearing force of the impeller blade of the stirrer. A uniform dispersion is produced in which the fractured finely ground solid powder particles of glass as well as the finely divided inorganic solid oxidic boron compound are evenly distributed throughout the polyester mass. The stirring of this intimate mixture is continued gently to prevent settling of the glass particles. This polyester/flame retarding agent/glass admixture is then combined with 2% methyl ethyl ketone peroxide as curing catalyst and a reinforcing amount of fiber-glass in the weight ratio of polyester-flame retarding agent-glass admixture to fiber-glass of 70:30. The resulting composite is cured in the conventional manner at 70°-75° F. for about 24 hours.

Sample cured products in plate form, omitting the fiber-glass, are separately produced according to this procedure from corresponding admixtures of unsaturated polyester, each of the above inorganic solid oxidic boron compounds and glass, and a comparison control cured product in plate form is separately produced from unsaturated polyester and glass alone, i.e. without any inorganic solid oxidic boron compound. Based on a combined total of 200 parts by weight of polyester, glass, and $Na_2B_4O_7 \cdot 10H_2O$ or $Na_2B_4O_7 \cdot 5H_2O$ or $H_3BO_3$ or $B_2O_3$, in various individual amounts, as the case may be, the sample cured products in plate form so produced are tested against a comparison sample cured product in plate form of 200 parts by weight of such resin and glass alone and without any flame retarding agent, as to their burn rates. Typical results are set forth in Table 1.

The flame retardant test results set forth in Table 1 below are obtained in accordance with the procedure of ASTM flame test D-635. All tests are based on cured resins in plate form having Barcol A S Hardness 8349. Such results are set forth by way of illustration and not limitation. Similar results are obtained using Q 6602 and 8349 orthophthatic unsaturated polyester, Ashland Chemical Co., as the general purpose polyester of formula I type.

flame retardance, independently of the conjoint assisting flame retarding effect contributed by any heat-

TABLE 1

| Formulation (pts. by wt.) | Parts by Wt. of Oxidic Boron Cmpd. Remaining-After Water Loss | Burn Rate-Inches/Min. Tests: | | |
|---|---|---|---|---|
| | | 1 | 2 | 3 |
| I-Resin Only-Admixture | | | | |
| R(200) — (Control) | 0 | 1.67 | 1.26 | 1.33 |
| R(120) + $Na_2B_4O_7 \cdot 10H_2O$ (80) | 42.4 | — | 0 | — |
| R(160) + $4O_7 \cdot 10H_2O$ (40) | 21.2 | — | 0 | — |
| R(180) + $Na_2B_4O_7 \cdot 10H_2O$ (20) | 10.6 | 0.3 | 0.36 | 0.43 |
| R(190) + $Na_2B_4O_7 \cdot 10H_2O$ (10) | 5.3 | — | — | 0.72 |
| R(196) + $Na_2B_4O_7 \cdot 10H_2O$ (4) | 2.1 | — | — | 1.04 |
| II-Resin + $Al(OH)_3$-Admixture | | | | |
| R(120) + $Al(OH)_3$ (80) — (Control) | 0 | 1.00 | 0.60 | — |
| R(120) + $Al(OH)_3$ (40) + $Na_2B_4O_7 \cdot 10H_2O$ (40) | 21.2 | — | 0 | — |
| R(120) + $Al(OH)_3$ (60) + $Na_2B_4O_7 \cdot 10H_2O$ (20) | 10.6 | — | 0 | — |
| III-Resin + Glass-Admixture (Invention) | | | | |
| R(120) + Glass (80) — (Control) | 0 | 1.3 | 0.97 | 0.97 |
| R(120) + Glass (76) + $Na_2B_4O_7 \cdot 10H_2O$ (4) | 2.1 | — | 0.95 | 0.85 |
| R(120) + Glass (70) + $Na_2B_4O_7 \cdot 10H_2O$ (10) | 5.3 | — | 0.73 | 0.50 |
| R(120) + Glass (60) + $Na_2B_4O_7 \cdot 10H_2O$ (20) | 10.6 | — | 0.57 | 0.46 |
| R(120) + Glass (50) + $Na_2B_4O_7 \cdot 10H_2O$ (30) | 15.9# | — | 0 | 0 |
| R(120) + Glass (40) + $Na_2B_4O_7 \cdot 10H_2O$ (40) | 21.2 | 0 | 0 | 0 |
| R(120) + Glass (57) + $Na_2B_4O_7 \cdot 5H_2O$ (23) | 15.9* | — | — | 0 |
| R(120) + Glass (64) + $Na_2B_4O_7$(anhy.) (16) | 16.0* | — | — | 0.92 |
| R(120) + Glass (52) + $H_3BO_3$ (28) | 15.8* | — | — | 0.60 |
| R(120) + Glass (64) + $B_2O_3$ (16) | 16.0* | — | — | 0.65 |
| IV-Comparison - Admixture | | | | |
| R(120) + Glass (40) + $Na_2CO_3$ (40) | — | — | — | 0.46 |

* - All these oxidic boron compounds substituted in the admixture in place of $Na_2b_4O_7 \cdot 10H_2O$ are adjusted in amount so as to provide a corresponding 16 parts by weight solid content after water loss and therefore a direct comparison equivalent to the (30) parts by weight loading of the admixture by $Na_2B_4O_7 \cdot 10H_2O$ in the zero burn rate admixture designated #.
R - Cured unsaturated polyester resin.
Glass - particulate glass according to U. S. Pat. No. 4,016,131.

The foregoing specific results of flame test D-635 clearly confirm that the flame retarding agent according to the invention is effective over a wide range of concentrations in the glass-containing cured resinous product. At certain concentrations of the oxidic boron compound the polyester specimen could not be ignited (zero burn rate). However, overall it is clear that the amount of water present and the gradient of temperatures of dissociation thereof in the decahydrate form, cannot adequately explain the flame retardant performance obtained. This is true, since among the various specific compounds tested, two contain no molecularly bound water at all, i.e. $Na_2B_4O_7$ (anhydrous form) and boron oxide, yet flame retardancy is nevertheless exhibited. Therefore, while it is preferred to utilize an oxidic boron compound as flame retardant according to the invention which has a large number of water molecules which are released at optimum temperatures, i.e. resin burning temperatures, because of the conjointly contributing heat absorbing effect thereof, apparently by way of a cooling or quenching mechanism or the like, nevertheless the flame retardant ability of those inorganic solid oxidic boron compounds containing no molecularly bound water demonstrates that the flame retarding mechanism is more complex and is not solely dependent upon the liberation of molecularly bound water, especially regarding the glass-containing polyester based resinous products.

Although as shown in Table 1, anhydrous sodium tetraborate $Na_2B_4O_7$ is less effective than the two moderately effective compounds boric acid $H_3BO_3$ and boron oxide $B_2O_3$, whereas the sodium tetraborate decahydrate $Na_2B_4O_7 \cdot 10H_2O$, and even the pentahydrate $Na_2B_4O_7 \cdot 5H_2O$, are extremely effective, nevertheless all of such compounds surprisingly exhibit the desired active flame retarding property and increase flame retardance, independently of the conjoint assisting flame retarding effect contributed by any heat-released molecularly bound or otherwise constituted or contained (e.g. $H_3BO_3$) water in the particular compound in question. As aforesaid, the distinction is believed to be plausibly explained by the observation that all such compounds are natural glass formers and thus inherently capable of forming glass upon being heated by the flame and in turn of flowing through the porosity of the given resin and high surface area glass particle matrix and of permeating and covering over the interfacial and interstitial local areas at the burning site to form a glass film or layer conjointly at and/or with the glass particle surfaces of the soda-containing silicate glass component, serving as a protective composite shield or barrier inert to combustion and acting to smother or snuff out the otherwise resin self-sustaining flame.

In any case, it is clear that sodium tetraborate decahydrate is the most beneficial of these flame retarding inorganic solid oxidic boron materials or agents in terms of its overall effect in bringing about flame retardance or in arresting continued burning of the resin. Hence, the present invention finds wide application for use in all appropriate types of resin compositions, especially those containing such glass ingredient for its own purpose in separately improving the physical and chemical properties of the resin according to said U.S. Pat. No. 4,016,131.

Suffice it to say that the results in Table 1 show that the corresponding flame retarding agent and glass particle components of the invention clearly provide conjointly improved results as compared to the pertinent control comparison admixtures including respectively aluminum trihydrate $Al(OH)_3$, such particulate glass alone, and sodium carbonate $Na_2CO_3$ in comparable amounts.

Further and more significant test results, especially regarding smoke retardation, are shown in Table 2 below. Such results are similarly set forth by way of illustration and not limitation. In Table 2, Marco resin 12277, W. R. Grace & Co., an all-purpose low viscosity resin, was used as the general purpose unsaturated polyester of formula I type, although similar results are also obtained using Alpha 52-59 FFR-2, and Ashland Q 6602 and 8349 resins, as the case may be.

TABLE 2

| Sample (% by wt.) | Flame Spread | Fuel Contribution | Smoke Developed |
|---|---|---|---|
| 1. 60% resin, 40% glass* (40% loading-(U.S. 4,016,131 | 195 | 55 | 310 |
| 2. 50% resin, 50% Al(OH)$_3$ (50% loading) - Conventional | 105 | 50 | 375 |
| 3. 60% resin, 20% glass*, 20% Na$_2$B$_4$O$_7$ . 10H$_2$O (40% loading with 50/50 mix) - Invention | 75 | 10 | 245 |
| 4. 60% resin, 40% Na$_2$B$_4$O$_7$ . 10H$_2$O (40% loading) - Flame retardant alone | 55 | 10 | 265** |

*Glass-particulate glass according to U.S. Pat. No. 4,016,131
**-Sample 4 had low structural strength.

The foregoing test results in Table 2 are obtained according to the procedure of ASTM - E84 on samples constituting fiber-glass reinforced polyester plastic board 24 ft. long, 2 ft. wide and ½ in. thick, produced in the manner of the samples tested in connection with Table 1.

While sample 1 (60:40 wt. ratio), consisting of resin and glass particles according to said U.S. Pat. No. 4,016,131, exhibits both the most pronounced flame spread and fuel contribution (from resin burning) and the next most pronounced smoke development, Table 2 shows that sample 4 (60:40 wt. ratio), consisting of resin and the decahydrate as flame retardant alone, exhibits the most effective flame retardancy, a favorably low fuel contribution and a very effective smoke retardancy, but is found to have poor physical properties. Sample 2 (50:50 wt. ratio), consisting of resin and the conventional flame retardant and filler aluminum trihydrate, exhibits only moderately effective flame retardancy and an unfavorably high fuel contribution, but more significantly the most pronounced smoke development. Lastly, sample 3 (60:20:20 wt. ratio), consisting of resin and the conjoint combination of such glass particles and sodium tetraborate decahydrate according to the invention, exhibits not only the next most effective flame retardancy and a favorably low fuel contribution, but more importantly the most effective smoke retardancy.

It will be realized that on the basis of the individual performances of the glass per sample 1 and of the borate per sample 4, it could not have been predicted that the conjoint presence of both of these components would lead to more significant results per sample 3. Such significant results per sample 3 are indeed surprising and demonstrate an unexpected synergistic difference and effect as compared with the individual performances of these two components. Moreover, of decisive practical import is the fact that the inclusion of borate alone as flame retarding agent leads to cured resins possessing poor structural strength and thus of limited mechanical or physical value in ordinary service. The high water absorption and reduction of necessary physical and chemical properties in the ultimate cured resin per sample 4 renders such product at best of highly doubtful utility. Also, the extremely high flame spread and slightly less high smoke development results in the case of the use of glass alone per sample 1 (e.g. as compared with the sample 2 results) renders the resin product of concomitant doubtful value or utility in terms of conjoint smoke and flame retardancy.

As compared with the 14.5% decrease in smoke development as between the 310 value per sample 1 (at no water loss) and the 265 value per sample 4 (at 37.6 pts. by wt. water loss) at the sacrifice of practical utility as a structural strength resin product occasioned by the adverse effects of water absorption, the 7.5% decrease in smoke development in turn as between the 265 value per sample 4 (at 37.6 pts. by wt. water loss) and the 245 value per sample 3 according to the invention (at 18.8 pts. by wt. water loss) without sacrifice of practical utility as a high structural strength resin product, represents a significant unpredicted synergistic improvement. This is all the more so when it is considered that the high flame spread value of 195 per sample 1 (aside from the high smoke developed at no water loss at all) is not retained in sample 3 according to the invention, but rather such sample 3 value of 75 is only comparatively slightly higher than that per sample 4 using double the amount of borate alone.

Of course, the overall array of results for samples 1 to 4 must also be considered in the light of the individual fuel contribution values.

It will be appreciated that the current governmental standard for flame retardants is the value of 100, yet more important today is the low degree or lowness of the smoke developed during any such burning of the resin. In general, the best special blend of resinous flame retardant material (which does not have the other, i.e. adverse structural or physical and/or chemical properties of the borate) has a smoke developed number or smoke development value of 250, whereas other conventional resinous flame retardant materials have smoke developed numbers or values ranging from 400 to 1500. Hence, the unique conjoint combination of glass particles and oxidic boron material according to the invention in conjoint effective amounts provides a valuable resin addition for producing improved smoke as well as flame retardancy in resinous products while retaining desirable high structural strength therein.

Consequently, the test results sufficiently establish that improved smoke retardancy as well as flame retardancy can be definitely imparted to cured resinous products by the conjoint presence in the precursor admixture composition of fractured finely ground solid powder particles of soda-containing silicate glass having a high and irregular surface area and an average particle size below about 40 mesh, and the instant similarly sized finely divided inorganic solid oxidic boron materials, all of which constitute natural glass formers and thus which inherently "in situ" in the cured resin matrix will form inert glass, e.g. at and/or with the glass particle surfaces of the soda-containing silicate glass, upon being heated by the burning resin flame to shield the resin functionally and/or mechanically from further combustion and concomitantly suppress smoke. Thus, any conjoint amount effective for achieving the results desired may be provided, such as those amounts noted above, although generally at least about 1% of each of the two additive components based on the combined weight of the resin and the respective additive component present will be incorporated in the admixture composition for achieving significant synergistic flame and smoke retarding results. Preferably, for reasons of economy and practicality the amount of the oxidic boron material flame retarding agent will be at most about 50% on the same basis, whereas for similar reasons especially as to practicality and structural efficiency in the ultimate cured resin product the amount of the glass particle component will be at most about 60% on such basis.

A most preferred combination according to the invention, in this regard, is that in Table 2, wherein the 60:20:20 weight ratio includes 25% boron oxidic compound and 75% resin based on the total weight of these two components, and likewise includes 25% glass particles and 75% resin based on the total weight of these latter two components, or includes 20% boron oxidic compound, 20% glass particles and 60% resin based on the total weight of the admixture of these three components. Such combination indeed provides significant synergistic conjoint flame and smoke retarding effects.

With regard to other pertinent formulations, a typical 100 lb. resin and fiber-glass basic mixture may include 75 lbs. (75%) polyester resin and 25 lbs. (25%) fiber-glass. A mixture according to said U.S. Pat. No. 4,016,131 may include, per concordant volume adjustment, 56 lbs. (60%) resin and 37½ lbs. (40%) glass particles, totaling 93½ lbs., for combining with such 25 lbs. of fiber-glass. The resultant 118½ lbs. will constitute roughly 47% resin and 32% glass particles, totaling 79%, plus 21% fiber-glass. It will be realized that due to the difference in density between the resin (density 1.1) and the glass particles (density 2.4), the 40% glass particle loading of the resin at 37½ lbs. plus the remaining 56 lbs. of resin, i.e. a composite of 93½ lbs., represents approximately the same volume as 75 lbs. of resin alone. Therefore, an appropriate loading of the resin with glass particles may take place for use with the fiber-glass without adversely disturbing the original volume of the resin. Of the total of 81 lbs. of resin and fiber-glass, the 56 lbs. of resin constitutes roughly 70% and the 25 lbs. of fiber-glass constitutes roughly 30%.

In line with the foregoing, one generally applicable formulation according to the invention contemplates 56 lbs. (63%) of such resin and 32¼ lbs. (37%) combined boron oxidic compound and glass particles, composed of 13½ lbs. (16%) boron oxidic compound and 18¾ lbs. (21%) glass particles, totaling 88¼ lbs., for combining with such 25 lbs. of fiber-glass. The resulant 113¼ lbs. will constitute roughly 49% resin and 29% combined boron oxidic compound and glass particles, composed of 12% boron oxidic compound and 17% glass particles, totaling 78%, plus 22% fiber-glass. The amount of the boron oxidic compound, i.e. here sodium tetraborate decahydrate (density 1.73), is similarly adjusted in relation to the amount of resin and glass particles, so that the total loading of the resin at 32¼ lbs. plus the remaining 56 lbs. of resin, i.e. a composite of 88¼ lbs., represents approximately the same volume as 75 lbs. of resin alone.

Another generally applicable formulation according to the invention constitutes 56 lbs. (61%) of such resin and 35 lbs. (39%) combined boron oxidic compound and glass particles, composed of 7 lbs. (8%) of such boron oxidic compound and 28 lbs. (31%) glass particles, to taking 91 lbs., for combining with such 25 lbs. of fiber-glass. The resultant 116 lbs. will constitute roughly 48% resin and 30% combined boron oxidic compound and glass particles, composed of 6% boron oxidic compound and 24% glass particles, totaling 78%, plus 22% fiber-glass. The amounts of boron oxidic compound and glass particles are similarly adjusted, so that the total loading of the resin at 35 lbs. plus the remaining 56 lbs. of resin, i.e. a composite of 91 lbs., represents approximately the same volume as 75 lbs. of resin alone.

Hence, typical formulations according to the invention, based roughly upon 56 lbs. of resin and 25 lbs. fiber-glass, may include roughly 22–45 lbs., preferably 32–35 lbs., of combined boron oxidic compound and glass particles, especially composed concordantly of 15–5 lbs. of boron oxidic compound and 17–30 lbs. of glass particles.

The three component formulations according to the invention as shown in Table 1, all combinable with fiber-glass in appropriate amounts as desired, represent further preferred embodiments herein.

All such formulations provide effective combined contents of the instant boron oxidic component and glass particle component for imparting conjoint flame and smoke retarding properties to the resin upon curing. Generally, such ingredients may be effectively employed in the foregoing stated broad, preferred and more preferred ranges in % by weight, e.g. either based upon the total weight of the resin and particular component together, or upon the total weight of the three component admixture, i.e. apart from the inclusion of the fiber-glass.

It will be realized that one of the most practical considerations in selecting a particular flame retarding agent from among those available according to the invention, apart from empirical performance results reflecting specific differences in degree of flame retardancy thereamong, is the relative cost and availability of the given compound in industrial scale quantities. In consideration of the generally recognized attractive low cost and ready availability in industrial scale quantities of $Na_2B_4O_7 \cdot 10H_2O$ in conjunction with the superior performance of $Na_2B_4O_7 \cdot 10H_2O$, and also in comparable terms of sodium tetraborate pentahydrate for the purposes in question, as regards the remaining specific instant inorganic solid oxidic boron compounds, all of which are natural glass formers, the sodium tetraborate decahydrate and pentahydrate will be generally preferred in that order for use as the basic flame retarding agent component along with the glass particle component in practicing the various improvement aspects of the present invention.

It will be appreciated that the instant specification and examples are set forth by way of illustration and not limitation, and that various modifications and changes may be made without departing from the spirit and scope of the present invention which is to be limited solely by the scope of the appended claims.

What is claimed is:

1. Composition for providing improved smoke and flame retardant high structural strength resinous products comprising an admixture of resin, fractured finely ground solid powder particles of soda-containing silicate glass having a high and irregular surface area and an average particle size below about 40 mesh, and a finely divided solid oxidic boron material capable of forming inert glass upon being heated and having an average particle size below about 40 mesh, said boron material being present in an effective amount for imparting an active cured resin flame retarding property, and said boron material and particles of glass correspondingly being present in a combined effective amount for imparting an active cured resin smoke retarding property.

2. Composition according to claim 1 wherein the particles of glass are substantially pre-cleaned, dry and moisture-protected, fractured, active, finely ground solid powder particles of soda-containing silicate glass having a high and irregular surface area and an active cured resin structurally reinforcing property.

3. Composition according to claim 2 wherein the resin is unsaturated polyester and the particles of glass have an active cured polyester structurally reinforcing property.

4. Composition according to claim 1 wherein the particles of glass are soda-lime silicate glass and are present in an amount of between about 1–60% based on the combined weight of the resin and particles of glass present, and the boron material is present in an amount of between about 1–50%, based on the combined weight of the resin and boron material present.

5. Composition according to claim 1 wherein the boron material and particles of glass are present in a combined effective amount of between about 25–50% by weight of the admixture.

6. Composition according to claim 5 wherein the boron material is present in an effective amount of between about 2–25% by weight of the admixture and the particles of glass are present in an amount of between about 15–40% by weight of the admixture.

7. Composition according to claim 5 wherein the boron material and particles of glass are present in a combined amount of between about 30–40% by weight of the admixture.

8. Composition according to claim 1 wherein the boron material is selected from at least one of sodium borate, boric acid and boron oxide.

9. Composition according to claim 8 wherein the boron material is sodium tetraborate.

10. Composition according to claim 9 wherein the sodium tetraborate contains molecularly bound water.

11. Composition according to claim 10 wherein the sodium tetraborate is the decahydrate.

12. Composition according to claim 11 wherein the sodium tetraborate and particles of glass are present in a combined effective amount of between about 25–50% by weight of the admixture.

13. Composition according to claim 12 wherein the boron material is present in an effective amount of between about 2–25% by weight of the admixture and the particles of glass are present in an amount of between about 15–40% by weight of the admixture.

14. Composition according to claim 1 wherein the resin is polyester.

15. Composition according to claim 1 wherein the admixture is combined with fiber-glass.

16. Composition according to claim 15 wherein the resin and fiber-glass are present in the weight ratio of about 50–90% resin to about 50–10% fiber-glass.

17. Composition according to claim 15 wherein said composition is in corresponding cured resin condition.

18. Composition according to claim 1 wherein the boron material is a sodium borate, the resin is a polyester, the sodium borate is present in an effective amount of between about 2–25% by weight of the admixture and the particles of glass are present in an amount of between about 15–40% by weight of the admixture, and such sodium borate and particles of glass are present in a combined amount of between about 20–50% by weight of the admixture, the admixture is combined with fiber-glass, and the admixture and fiber-glass are present in the weight ratio of about 70–90% admixture to about 30–10% fiber-glass.

19. Composition according to claim 18 wherein said composition is in corresponding cured resin condition.

20. Composition according to claim 1 for providing improved smoke and flame retardant high structural strength resinous products comprising an intimate admixture in the form of a substantially uniform dispersion of unsaturated polyester resin, finely divided sodium tetraborate having an average particle size below about 325 mesh and substantially pre-cleaned, dry and moisture-protected, fractured, active, finely ground solid powder particles of soda-containing silicate glass having a high and irregular surface area, an average particle size below about 325 mesh and an active cured polyester structurally reinforcing property, the sodium tetraborate being present in an effective amount for imparting an active cured polyester flame retarding property, and the sodium tetraborate and particles of glass correspondingly being present in a combined effective amount for imparting an active cured polyester smoke retarding property.

21. Composition according to claim 20 wherein the sodium tetraborate contains molecularly bound water, the sodium tetraborate is present in an effective amount of between about 2–25% by weight of the admixture, the particles of glass are soda-lime silicate glass and are present in an amount of between about 15–38% by weight of the admixture, and such sodium tetraborate and particles of glass are present in a combined amount of between about 30–40% by weight of the admixture.

22. Composition according to claim 21 wherein the admixture is combined with fiber-glass in the weight ratio of about 70–90% admixture to about 30–10% fiber-glass.

23. Composition according to claim 22 wherein said composition is in corresponding cured resin condition.

24. Method comprising curing the admixture combination according to claim 15 to form a corresponding cured resin composite product.

25. Method comprising curing the admixture combination according to claim 18 to form a corresponding cured resin composite product.

26. Method comprising curing the admixture combination according to claim 22 to form a corresponding cured resin composite product.

27. Method for imparting improved smoke and flame retardancy to resinous products comprising incorporating fractured finely ground solid powder particles of soda-containing silicate glass having a high and irregular surface area and an average particle size below about 40 mesh, and a finely divided solid oxidic boron material capable of forming inert glass upon being heated and having an average particle size below about 40 mesh, into the corresponding resin in intimate and substantially uniform distribution therein to form an admixture therewith prior to curing, said boron material being incorporated in an effective amount for imparting an active cured resin flame retarding property, and said boron material and particles of glass correspondingly being incorporated in a combined effective amount for imparting an active cured resin smoke retarding property.

28. Method according to claim 27 wherein the particles of glass are substantially pre-cleaned, dry and moisture-protected, fractured, active, finely ground solid powder particles of soda-containing silicate glass having a high and irregular surface area, and an active cured resin structurally reinforcing property.

29. Method according to claim 28 wherein the resin is unsaturated polyester and the particles of glass have an active cured polyester structurally reinforcing property.

30. Method according to claim 27 wherein the particles of glass are soda-lime silicate glass and are present in an amount of between about 1–60% based on the combined weight of the resin and particles of glass present, and the boron material is present in an amount of between about 1–50%, based on the combined weight of the resin and boron material present.

31. Method according to claim 27 wherein the boron material and particles of glass are present in a combined effective amount of between about 25–50% by weight of the admixture.

32. Method according to claim 31 wherein the boron material is present in an effective amount of between about 2–25% by weight of the admixture and the particles of glass are present in an amount of between about 15–40% by weight of the admixture.

33. Method according to claim 31 wherein the boron material and particles of glass are present in a combined amount of between about 30–40% by weight of the admixture.

34. Method according to claim 27 wherein the boron material is selected from at least one of sodium borate, boric acid and boron oxide.

35. Method according to claim 34 wherein the boron material is sodium tetraborate.

36. Method according to claim 35 wherein the sodium tetraborate contains molecularly bound water.

37. Method according to claim 36 wherein the sodium tetraborate is the decahydrate.

38. Method according to claim 27 wherein the resin is polyester.

39. Method according to claim 27 wherein the admixture is combined with fiber-glass and the admixture combination thereafter cured.

40. Method according to claim 27 for imparting improved smoke and flame retardancy to resinous products comprising incorporating substantially pre-cleaned, dry and moisture-protected, fractured, active, finely ground solid powder particles of soda-containing silicate glass having a high and irregular surface area, an average particle size below about 325 mesh and an active cured polyester structurally reinforcing property, and finely divided sodium tetraborate having an average particle size below about 325 mesh, into unsaturated polyester resin in intimate and substantially uniform finely divided distribution therein to form an admixture therewith in the form of a substantially uniform dispersion in such resin prior to curing, the sodium tetraborate being incorporated in an effective amount for imparting an active cured polyester flame retarding property, and the sodium tetraborate and particles of glass correspondingly being incorporated in a combined effective amount for imparting an active cured resin smoke retarding property.

41. Method according to claim 40 wherein the sodium tetraborate contains molecularly bound water, the sodium tetraborate is present in an effective amount of between about 2–25% by weight of the admixture, the particles of glass are soda-lime silicate glass and are present in an amount of between about 15–38% by weight of the admixture, and such sodium tetraborate and particles of glass are present in a combined amount of between about 30–40% by weight of the admixture.

42. Method according to claim 41 wherein the admixture is combined with fiber-glass in the weight ratio of about 70–90% admixture to about 30–10% fiber-glass and the admixture combination thereafter cured.

43. Composition comprising an admixture of unsaturated polyester resin, substantially pre-cleaned, dry and moisture-protected, fractured, active, finely ground solid powder particles of soda-lime silicate glass having a high and irregular surface area and an active cured polyester structurally reinforcing property, and a finely divided solid oxidic boron material capable of forming inert glass upon being heated and selected from at least one of sodium borate, boric acid and boron oxide, said boron material being present in an effective amount of between about 2–25% by weight of the admixture and said particles of glass being present in an effective amount of between about 15–38% by weight of the admixture, and said boron material and particles of glass correspondingly each having an average particle size below about 325 mesh and both being present in a combined conjointly effective amount of between about 30–40% by weight of the admixture, for imparting an active smoke and flame retarding property to the cured resin, and said admixture being combined with fiber-glass in a weight ratio of about 70–90% admixture to about 30–10% fiber-glass.

44. Method comprising curing the admixture combination according to claim 43 to form the corresponding cured resin composite product.

45. Method for imparting improved smoke and flame retardancy to resinous products comprising incorporating substantially pre-cleaned, dry and moisture protected, fractured, active, finely ground solid powder particles of soda-lime silicate glass having a high and irregular surface area and an active cured polyester structurally reinforcing property, and a finely divided oxidic boron material capable of forming inert glass upon being heated and selected from at least one of sodium borate, boric acid and boron oxide, into unsaturated polyester resin in intimate and substantially uniform distribution therein to form an admixture therewith prior to curing, said boron material being incorporated in an effective amount of between about 2–25% by weight of the admixture and said particles of glass being incorporated in an effective amount of between about 15–38% by weight of the admixture, and said boron material and particles of glass correspondingly each having an average particle size below about 325 mesh and both being incorporated in a combined conjointly effective amount of between about 30–40% by weight of the admixture, for imparting an active smoke and flame retarding property to the cured resin, and thereafter combining said admixture with fiber-glass in a weight ratio of about 70–90% admixture to about 30–10% fiber-glass.

46. Method according to claim 45 wherein the admixture combination is thereafter cured.

* * * * *